Figure 1:
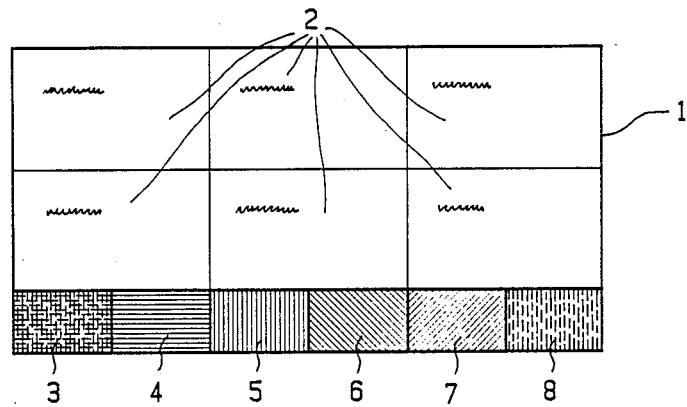

United States Patent [19]

Strauss

[11] Patent Number: 4,846,503

[45] Date of Patent: Jul. 11, 1989

[54] COLOUR-CODING OF DATA CARRIERS

[75] Inventor: Norbert Strauss, Puchheim/Bhf., Fed. Rep. of Germany

[73] Assignee: Seidl & Partner GmbH, Puchheim/Bhf., Fed. Rep. of Germany

[21] Appl. No.: 130,880

[22] Filed: Dec. 10, 1987

[30] Foreign Application Priority Data

Dec. 11, 1986 [DE] Fed. Rep. of Germany ....... 3642397

[51] Int. Cl.⁴ ............................................. B42D 15/00
[52] U.S. Cl. ........................................ 283/70; 283/81; 283/114
[58] Field of Search .............................. 283/70, 114, 81

[56] References Cited

PUBLICATIONS

IBM Technical Disclosure Bulletin, vol. 14, No. 3, p. 783 (1971).

Primary Examiner—Paul A. Bell
Attorney, Agent, or Firm—Parmelee, Bollinger & Bramblett

[57] ABSTRACT

The present is a description of a method for color coding data carriers, such as labels, which comprise a substrate onto which several color code segments of various colorations have been deposited. In a programme controlled process it is possible to render the coloration of each individual color code segment unidentifiable so that the combination of the remaining color code segments yield the desired color code. In this way it is possible to carry out color coding using a single-color printer for instance.

2 Claims, 1 Drawing Sheet

COLOUR-CODING OF DATA CARRIERS

The invention relates to a process for colour-coding data carriers, especially labels, which comprise a substrate onto which several colour code segments of various colourations have been applied.

For organizational reasons and for reasons of identification, objects such as merchandise or files are often marked with data carriers onto which certain markings or sorting criteria which have been encoded in a suitable manner are applied. For this purpose, the marking surfaces of the data carriers have different colours, structures, symbols, grids and/or perforations. At present, these markings are all applied for one of the individually produced codes onto the data carrier of a continuous sheeting, web or length (usually roll-shaped or as a fanfold stack), so that the number of continuous sheetings needed corresponds to the number of different organization markings. This in turn leads to immense organizational and storage problems in cases where the most important sorting criterium does not correspond to the organization of the markings, as it is not possible to simply change the organization markings without a great deal of technical, and thus economic, effort. This then again means that (a) one either needs as many printers connected to a computer in the appropriate way as there are organization markings, which furthermore leads to more extensive subsequent sorting, (b) or one has to use a printer with an automatic front-feed device for the different sheetings, (c) or one feeds the different sheetings into a conventional printer by hand, which in turn is relatively uneconomical.

Page 783 of IBM TDB, Volume 14, No. 3, August 1971, discloses a method according to the preamble of patent claim 1. In the first alternative of this known method, the substrate to be coded is provided with several adjacent and parallel rows of various colourations, each of which is overprinted by a conventional printer in order to be coded, so that each of the rows is interrupted several times by a black overstrike character. In order to form a clock track, one of the rows is alternately overprinted and not overprinted. Hence, in the finished code according to this known method, the individual rows still regularly appear, at least partially, so that it is difficult to visually read the code. The second alternative of this known method provides a single row only which is partially blackened by being overprinted and is thus coded. The use of a single colour only renders the visual readability thereof even more difficult.

In contrast thereto, the object of the invention is to improve the visual readability of the colour code when using several colour code segments.

According to this invention, the object is achieved by completely cancelling at least one colour code segment by means of a programme controlled device, especially a printing device, for instance by completely overprinting said colour code segment, punching it out or the like.

Preferably, the cancelled colour code segment is overprinted with the colour designation of the non-cancelled colour code segment.

In this case, the term "colour coding" is to be understood in its broadest sense, i.e it not only embraces the process of coding by means of various colours, but for instance also different shades of the same colour and different visual impressions, for example by varying the surface finish of the data carrier. Even at great distances, this colour code ensures that it can be read more rapidly and accurately than a monochrome symbolic code, for instance by means of letters and numbers.

Figure 2:
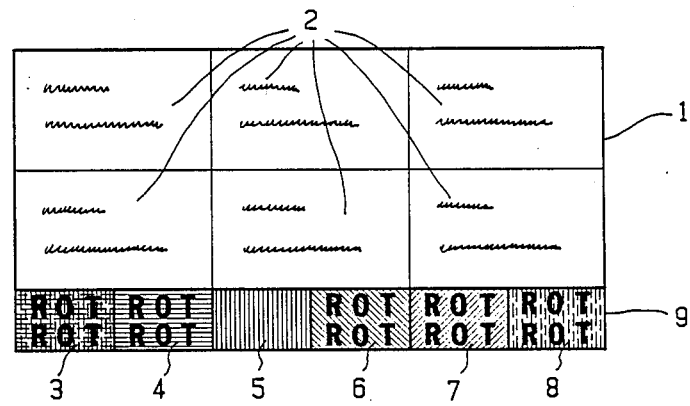
Figure 3:
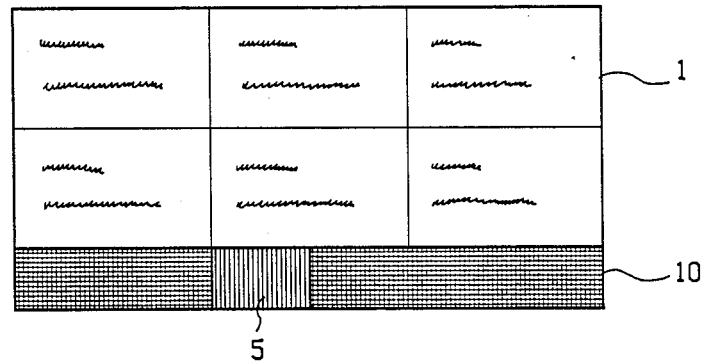

The following is a more detailed description of the invention which makes reference to the attached illustrations. The illustrations show:

FIG. 1 a data carrier according to the invention before it is processed by an electronic data processing installation and FIG. 2 and 3 two data carriers according to FIG. 1 after they have been alternatively processed by an electronic data processing installation.

The data carrier according to the illustrations comprises a substrate 1 which can be made of paper, cardboard, plastic or metal or of several different layers of the aforementioned materials. One of the essential components of this data carrier is the colour code segments 3 to 8 which can basically be arranged anywhere on the data carrier; however, these colour code segments are preferably arranged next to one another on one of the edges of the data carrier 1, as is shown in the illustration. Should the data carrier exhibit free segments or areas 2 within the colour code segments 3 to 8, the former can be provided with all kinds of information such as text or symbols.

The basic idea of this invention is to carry out a different colour coding of several data carriers 1, which initially exhibit an absolutely identical combination of the colour code segments, said colour coding being subsequently programme controlled and if necessary carried out during the process of overprinting the free segments 2.

To give an example it is assumed that segments 3 to 8 exhibit the following colours in the following order: yellow, light blue, red, green, brown, violet. If this data carrier is to receive a colour code segment with the colour red, in a programme-controlled process almost the whole surface of the segments 3, 4 and 6 to 8 is given an opaque covering, for instance by a matrix printer, so that the unwanted colours are practically invisible (see FIG. 3). Furthermore, the term for the desired code colour "RED" can preferably be printed onto these covered colour code segments 3, 4 and 6 to 8 (see FIG. 2). Needless to say in this case the surface of the segment may not be covered in so opaque a manner that the printed colour term "RED" is not visible.

FIG. 3 is an alternative to the method of coding according to FIG. 2 wherein the segments 3, 4 and 6 to 8 are the unwanted colour code and thus completely blackened out so that only the colour of the red colour segment 5 remains visible.

In the embodiment according to FIG. 2, the surface covering of the unwanted colour code segments can be done away with altogether, it only being necessary to print the code word "RED" in bold face.

The data carriers of the invention can be advantageously produced in the form of continuous sheetings to be printed on electronic data processing printers. The colour coding itself takes place in the electronic data processing printer via complete or partial overprinting of individual colour code segments. In order to increase the coding diversity, numerous colour code segments, for instance two or three colour code segments, can be used in a manner known per se, i.e. left unprinted in the electronic data processing installation, so that a combination of two or three colour code segments will produce the desired code.

In addition to the process of overprinting as described above, there are also other measures which can be employed in the scope of the invention for the programme controlled production of the desired colour coding, for instance by completely or partially punching out or perforating the unwanted colour code segments or by treating the surfaces thereof in a suitable manner (e.g. by roughening them) in order to change the initial colour effect of the colour code segment.

I claim:

1. A method for color-coding with a desired color code data carriers comprising a substrate onto which several color code segments of various colorations have been deposited, said method comprising fully cancelling at least one of said deposited color code segments by means of a program controlled device to render the colorations of said at least one color code segment unidentifiable so that the combination of the remaining color code segments yields the desired color code.

2. The method according to claim 1 wherein at least one of the cancelled color code segments is overprinted with the color designation of a non-cancelled color code segment.

* * * * *